US009485899B2

(12) United States Patent
Ribo et al.

(10) Patent No.: US 9,485,899 B2
(45) Date of Patent: Nov. 8, 2016

(54) METHOD AND DEVICE FOR HITCHING AN AGRICULTURAL IMPLEMENT TO A THREE-POINT LIFTING SYSTEM OF AN AGRICULTURAL TRACTOR

(71) Applicant: TRACTO-LOCK, Verdun En Lauragais (FR)

(72) Inventors: Robert Ribo, Verdun en Lauragais (FR); Romain Ribo, Verdun en Lauragais (FR); Bastien Boulnois, Antibes (FR)

(73) Assignee: Tracto-Lock, Domaine de L'Obit (FR)

( * ) Notice: Subject to any disclaimer, the term of this patent is extended or adjusted under 35 U.S.C. 154(b) by 0 days.

(21) Appl. No.: 14/430,857

(22) PCT Filed: Sep. 23, 2013

(86) PCT No.: PCT/FR2013/000249
§ 371 (c)(1),
(2) Date: Mar. 24, 2015

(87) PCT Pub. No.: WO2014/044932
PCT Pub. Date: Mar. 27, 2014

(65) Prior Publication Data
US 2015/0230388 A1 Aug. 20, 2015

(30) Foreign Application Priority Data
Sep. 24, 2012 (FR) ...................... 12 02527

(51) Int. Cl.
*A01B 51/00* (2006.01)
*A01B 59/06* (2006.01)
*A01B 59/00* (2006.01)

(52) U.S. Cl.
CPC ........... *A01B 59/064* (2013.01); *A01B 59/002* (2013.01); *Y10T 29/49826* (2015.01)

(58) Field of Classification Search
CPC .. A01B 59/06; A01B 59/002; A01B 59/064; A01B 59/062; B62D 49/007; B60D 1/02
USPC ...... 248/653; 280/407, 405.1, 400; 172/248, 172/272
See application file for complete search history.

(56) References Cited

U.S. PATENT DOCUMENTS 3,432,184 A * 3/1969 Tweedy ............... A01B 59/004
172/272
4,015,855 A * 4/1977 Murray ................... B60D 1/02
172/248

(Continued)

FOREIGN PATENT DOCUMENTS

AU        532 915 B2    10/1983
GB       2 040 664 A    9/1980

(Continued)

*Primary Examiner* — Todd M Epps
(74) *Attorney, Agent, or Firm* — Orrick, Herrington & Sutcliffe LLP (57) ABSTRACT

The invention relates to a device for coupling an agricultural implement to an agricultural tractor (1), comprising two frames (10) each provided with two base plates (11*a*) arranged such that each base plate (11*a*) of the frame (10) carried by the agricultural tractor (1) is brought into position under the base plate of the frame carried by the agricultural implement, in such a way as to form, with the latter, a pair of base plates consisting of a base plate pierced by a hole of predefined cross-section and dimensions and a base plate (11) comprising a centering member (18, 19) of decreasing cross-section starting from a base section of dimensions and cross-section matching those of the hole of the other base plate. In addition, tilting means are designed to cause, in a position where the centering members (18, 19) are partially engaged with the facing holes, a relative tilting of the two frames during which said centering members serve as the pivot for said tilting.

20 Claims, 9 Drawing Sheets

(56) References Cited

U.S. PATENT DOCUMENTS

4,431,207 A * 2/1984 Langenfeld .............. B60D 1/02
172/248
5,950,735 A 9/1999 Godbersen

FOREIGN PATENT DOCUMENTS

GB 2 408 669 A 6/2005
WO WO 2014/044932 A1 3/2014

\* cited by examiner

METHOD AND DEVICE FOR HITCHING AN AGRICULTURAL IMPLEMENT TO A THREE-POINT LIFTING SYSTEM OF AN AGRICULTURAL TRACTOR

The invention relates to a method for hitching an agricultural implement to a three-point linkage system of an agricultural tractor, as well as a coupling device for carrying out this method.

As was highlighted in a report from the French Department of Agriculture in a collective work entitled "Agricultural tractor-agricultural implement connections" published in 2006, the coupling and uncoupling of agricultural implements onto three-point linkage devices of agricultural tractors are very delicate operations to perform and are the cause of many accidents.

Despite this, the findings of this report are very negative concerning "foreseeable technological innovations in mechanical connections" that could solve this problem.

In fact, the sole preferred route in this report consists of the installation of "coupling triangles" composed of two triangular frames to be secured respectively to the three-point linkage system of the agricultural tractor and to the agricultural implement, and designed to fit together in a single operation carried out by the operator from the tractor seat or cab.

However, it turns out that such coupling triangles have been known for decades, as is evidenced by French patent FR14 63146 which relates to improved coupling triangles intended for coupling reversible ploughs, and despite the longstanding existence of these coupling devices, their use has remained very restricted. This lack of actual use of such coupling devices is primarily explained by the difficulties operators encounter in properly fitting the coupling triangles together without leaving the seat or cab.

To overcome this disadvantage, many variants have been considered, in particular those described in FR14 63146, U.S. Pat. No. 5,950,735, GB 2,040,664 etc., and including the embodiment described in patent AU 532 915 which consists of a coupling device in which one of the frames supports three conical centering members distributed at the vertices of an isosceles triangle having a base extending along a transverse axis (y), each adapted to engage an opening in the other frame.

In that solution, although differing in structure the coupling members of the two frames define two triangles of a function equivalent to conventional "coupling triangles": the coupling of the two frames by means of such a coupling device in effect requires positioning the three centering members in vertical alignment with openings intended to house them, then to raise the three-point linkage system so that said centering members engage with said openings.

The advantage provided by that coupling device over conventional coupling triangles lies in the margin this gives the operator for positioning error within a horizontal plane, due to the conical form of the coupling members. However, in actual practice this positioning margin alone proves insufficient to guaranteeing easy coupling of the two frames.

The present invention also relates to a solution consisting of creating a coupling device comprising two frames adapted to be respectively secured to the three-point linkage system of the agricultural tractor and to the agricultural implement, and its main object is to provide a coupling device that allows carrying out easily, and directly from the tractor cab or seat, the juxtaposition and relative locking of these two frames.

Another object of the invention is to provide a coupling device designed to allow directly coupling, from the cab or seat, the universal drive shafts connected to the agricultural tractor and to the agricultural implement.

To this end, the invention firstly relates to a method for coupling an agricultural implement to a three-point linkage system of an agricultural tractor of longitudinal axis (x), wherein:

a coupling device is used comprising two frames consisting of a frame referred to as the coupling frame, provided with fastening members for attaching to the three-point linkage system of the agricultural tractor, and a frame referred to as the coupled frame, provided with fastening members for attaching to the agricultural implement, both adapted to extend, respectively, transversely to the agricultural tractor and to the agricultural implement, the coupling is performed, in an initial prepositioning position of the agricultural tractor relative to the agricultural implement, by maneuvers to pair the two frames, then by the relative locking of said frames.

According to the invention, this coupling method consists of:

creating a coupling device:
in which the coupling frame and the coupled frame each comprise two elements referred to as base plates, arranged at the base of said frames so that the base plates of each frame are spaced apart from each other and aligned along a transverse axis (y), and so that each base plate of the coupling frame forms, with one of the base plates of the coupled frame, a pair of base plates provided with flat contact faces arranged so that the contact face of the base plate of the coupled frame rests on the contact face of the base plate of the coupling frame when said frames are in the paired position, one of the base plates of each pair of base plates being pierced by a hole of predetermined cross-section and dimensions, and the other base plate of each pair of base plates comprising, projecting from its contact face, a centering member of decreasing cross-section in at least two planes perpendicular to said contact face and respectively parallel to axes (x) and (y), starting from a base section of dimensions fitting with those of the hole of the other base plate, comprising means for relative tilting of the two frames, and the coupling is carried out in the initial prepositioning position of the agricultural tractor relative to the agricultural implement, by (a) actuating the linkage system so that each centering member partially engages with the facing hole, by the raising of the coupling frame, then (b) generating the relative tilting of the two frames so as to cause, in the position where the centering members are partially engaged with the facing holes, a tilting during which said centering members serve as the pivot for said tilting, until a final paired position is obtained where the contact faces of the base plates of each of the two pairs of base plates are superimposed and in contact with one another, and the centering members are fully engaged with the facing holes.

(It should be noted that the frame "base" according to the invention is intended to refer to the lower portion of the frames, meaning the portion of the frames closest to the ground when the frames are respectively mounted on the agricultural implement and on the agricultural tractor. In addition, "transverse axis (y)" is understood to mean an axis orthogonal to the longitudinal axis (x).

The coupling method according to the invention therefore comprises:
creating a coupling device mainly comprising:
two centering members arranged at the base of one of the frames and aligned along a transverse axis (y), adapted so that each partially engages with a hole made at the base of the other frame when the three-point linkage system of the agricultural tractor is raised,
means for relative tilting of the two frames, adapted to cause a tilting during which the centering members serve as the pivot for said tilting,
imparting to this coupling device specific operating kinematics composed of two successive movements:
a first lifting movement of the frame coupled to the three-point linkage system, adapted to cause the centering members to engage partially with the facing hole of the other frame,
a second relative tilting movement of the two frames during which the centering members penetrate completely into the facing holes and after which the two frames are perfectly joined in a relative position where they are integral due to their interlocking.
According to this design:
positioning errors along the longitudinal axis (x) and along the transverse axis (y) are corrected during penetration of the centering members into the facing holes so that, at the end of the tilting, complete engagement of said centering members within said holes is obtained,
vertical positioning errors are corrected with the two frames in the final joined position,
and, in actual practice, the coupling device allows coupling an implement to an agricultural tractor without human intervention and without requiring meticulous prepositioning, because it "absorbs" errors in the relative positioning of the two frames in each of the three axes (x, y, z).

According to a first mode advantageous implementation of the method according to the invention, the linkage system is equipped with a central arm consisting of an actuating cylinder, and (b) the relative tilting of the two frames is generated by activating the deployment of said cylinder.

Such a cylinder, which replaces the conventional adjustable top link, is an economical solution in terms of cost (procurement and installation).

In a second advantageous embodiment of the method according to the invention:
the coupling frame is equipped with at least one pivot arm pivoting on said coupling frame about a pivot axis at least substantially parallel to axis (y), positioned at the base of said coupling frame, each of said pivot arms having a hook-shaped end that engages, in the position where the centering members are partially engaged with the facing holes, with a catch member integral with the coupled frame,
(b) the relative tilting of the two frames is generated by pivoting each pivot arm so that its hook-shaped end travels a path in which it engages the facing catch member, causing the coupling frame to tilt.

The invention extends to a device for coupling an agricultural implement to a three-point linkage system of an agricultural tractor of longitudinal axis (x), comprising a coupling device comprising two frames consisting of a frame referred to as the coupling frame, provided with fastening members for attaching to the three-point linkage system of the agricultural tractor, and a frame referred to as the coupled frame, provided with fastening members for attaching to the agricultural implement, both adapted to extend, respectively, transversely to the agricultural tractor and to the agricultural implement, said coupling frame and coupled frame being adapted to be paired and comprising relative locking means.

According to the invention, this coupling device is characterized in that:
the coupling frame and the coupled frame each comprise two elements referred to as base plates, arranged at the base of said frames, so that the base plates of each frame are spaced apart from each other and aligned along a transverse axis (y), and so that each base plate of the coupling frame forms, with one of the base plates of the coupled frame, a pair of base plates provided with flat contact faces arranged so that the contact face of the base plate of the coupled frame rests on the contact face of the base plate of the coupling frame when said frames are in the paired position,
one of the base plates of each pair of base plates being pierced by a hole of predetermined cross-section and dimensions,
and the other base plate of each pair of base plates comprising, projecting from its contact face, a centering member of decreasing cross-section in at least two planes perpendicular to said contact face and respectively parallel to axes (x) and (y), from a base section of dimensions fitting with those of the hole of the other base plate,
and said base plates being arranged to be brought facing one another so that each centering member partially engages with the facing hole, during the raising of the coupling frame generated by actuation of the three-point linkage system,
means for relative tilting of the two frames are adapted to cause, in the position where the centering members are partially engaged with the facing holes, a tilting during which said centering members serve as the pivot for said tilting.

According to a first advantageous embodiment of the invention, the means for relative tilting consist of an actuating cylinder arranged such that it constitutes the central arm of the linkage system.

In this embodiment, the locking means advantageously further comprise according to the invention:
at least one locking arm pivoting on the coupling frame, provided with a hook-shaped end that engages, in the paired position of the two frames, with a catch member integral with the coupled frame,
means for actuating each locking arm, able to rotate it between an unlocked position and a locked position where the facing catch member is locked in place.

Still according to this variant, the locking means may also advantageously comprise, according to another embodiment, an actuating cylinder carried by the coupling frame so that it extends along a transverse axis orthogonal to axis (x), provided with a rod forming a bolt adapted to cooperate with a catch mounted on the coupled frame, when the two frames are in the paired position.

According to a second advantageous embodiment of the invention, the means for relative tilting comprise:
at least one pivot arm pivoting on the coupling frame about a pivot axis at least substantially parallel to axis (y), positioned at the base of said coupling frame, each of said pivot arms having a hook-shaped end that engages, in the position where the centering members are partially engaged with the facing holes, with a catch member integral with the coupled frame, means for actuating each pivot arm, adapted to pivot it so that its hook-shaped end travels a path in which it engages the facing catch member, causing the coupling frame to tilt until the adjoining position of the two frames is reached.

Such a pivot arm may also advantageously carry out the function of locking the two frames, and for this purpose, advantageously according to the invention, the hook-shaped end of each pivot arm and each associated catch member have complementary shapes adapted to lock the two frames in their paired position.

Furthermore, according to this second embodiment, the coupling device also comprises, advantageously according to the invention, an actuating cylinder arranged such that it constitutes the central arm of the linkage system, and intended in particular to allow more easily adapting the tilt angle of the coupling frame to the various tilt angles of agricultural implements.

According to another advantageous embodiment of the invention intended to increase the amplitude of the tilt, each hole made in a base plate has a countersink where it joins the contact face of said base plate.

Moreover, advantageously according to the invention, each hole made in a base plate consists, in the extension of the countersink, of a hole of constant transverse cross-section, and each centering member comprises, from the contact face of the base plate, a base of constant transverse cross-section fitting with that of the facing hole.

Each hole thus has a bearing surface supporting the base of the centering members, to accommodate shear stresses.

In an advantageous embodiment, each centering member comprises a cylindrical base extending in a section of conical or hemispherical shape, each hole made in a base plate having a circular cross-section of a diameter fitting with that of the base of the centering members.

According to another advantageous embodiment of the invention, the coupling frame and the coupled frame comprise front faces for the contact of said frames when in their final adjoining position.

In addition, one of the frames advantageously comprises, projecting from its front contact face, at least one centering pin of decreasing cross-section in at least one plane perpendicular to said front contact face and parallel to the longitudinal axis (x), and the other frame comprises, for each centering pin, a hole opening onto its front face, having a cross-section suitable for receiving said centering pin.

In addition, these centering pins are preferably arranged on an upper portion of the frame in order to be as far as possible from the centering members, which allows refining the relative positioning of the frames in their final adjoining position.

Each of these centering pins further comprises two flat portions in planes parallel to plane (x, y), and each associated hole comprises flat bearing surfaces for each of said flat portions, intended to prevent any relative displacement of the two frames along an axis (z) orthogonal to plane (x, y).

According to another advantageous embodiment of the invention, the coupling device comprises:
complementary drive elements respectively positioned on the coupling frame and coupled frame and both adapted to be coupled to universal drive shafts equipping the agricultural tractor and the agricultural implement,
means for the relative displacement of the complementary drive elements, which are able, in the paired position of the two frames, to move them between an engaged position where two universal drive shafts are coupled, and a disengaged position.

These drive elements allow, once the two frames are locked, coupling the universal drive shafts connected to the agricultural tractor and to the agricultural implement, directly from the cab or seat, simply by actuating the means for the relative displacement of said drive elements, so that, according to the invention, all linkage operations are fully carried out from the cab or seat.

According to an advantageous embodiment relating to these drive elements, the drive element of the coupled frame is translationally fixed on said coupled frame, and the drive element of the coupling frame is arranged within a track having its guide axis parallel to the longitudinal axis (x), attached to said coupling frame, said drive element being associated with means for translational movement which are able to move it within the track, In addition, these drive elements advantageously comprise, according to the invention, a shaft provided with splines and a shaft pierced with a longitudinal bore provided with splines, said splines forming complementary engaging teeth.

Other objects, features, and advantages of the invention will become apparent from the following detailed description with reference to the accompanying drawings which show three preferred embodiments by way of non-limiting example. In the drawings.

(For purposes of simplicity and clarity of the description, the coupling devices according to the invention are described below as secured to an agricultural tractor and to an agricultural implement resting on the ground, the terms vertical, horizontal, above, below, etc. being used in reference to such a positioning. In addition, the terms front and rear are used relative to the direction of forward motion of the agricultural tractor).

The coupling devices shown as examples in FIGS. 1-10, 11-14, and 15, 16 respectively consist of devices for coupling an agricultural implement 3 to the three-point linkage system 2 of an agricultural tractor 1 having longitudinal axis (x), said linkage system comprising, in the usual manner:

two lower arms such as 4 provided with an end consisting of a locking hook 5, and each connected by an adjustable-length rod such as 7 to a lifting arm such as 6 which is pivoted by a hydraulic cylinder such as 8, a central arm (or upper arm) consisting in this example of a hydraulic cylinder 9.

Each of these coupling devices further comprises a coupling frame adapted to be mounted on the linkage system 2 of the agricultural tractor 1, and a coupled frame adapted to be mounted on the agricultural implement 3, said frames being provided with locking means suitable for keeping them locked in a coupling position where they are joined.

FIGS. 1 to 10 represent a first embodiment of the coupling device according to the invention, where the coupling frame 10 firstly comprises a welded structure comprising:

a cross-piece 11 adapted to extend transversely along an axis (y) perpendicular to axis (x) and composed, in the example, of a tube of square cross-section having an upper face 11a and a lower face 11b, and a portal frame 12 formed by a top rail 13 and two uprights such as 14, composed of tubes of square cross-section, said portal frame extending over the upper face 11a of the cross member 11 and dividing this upper face 11a into a central portion 11c having an end section such as 11e extending to either side, said cross-piece and portal frame defining a planar front contact face 10a.

This coupling frame 10 further comprises:

two clevises such as 15 extending below the lower face 11b of the cross-piece 11, each housing a ball 16 constituting the catch member of the locking hook 5 of one of the lower arms 4 of the linkage system 2, a clevis 17 extending over the front face 13a of the top rail 13 of the portal frame 12, housing a transverse shaft 17a constituting the catch member of the central arm 9 of the linkage system 2.

According to the invention, this coupling frame 10 also comprises two centering pins 18, 19 each projecting from the end section 11e of the upper face 11a of the cross-piece 11, each of said end sections constituting one of the "base plates" of said coupling frame.

In the example, each of these centering pins 18, 19 has a cylindrical base 20 extended by a section 21 of conical shape.

The coupling frame 10 also comprises a locking arm 22 provided with a hook-shaped end 23 extending into the rearward extension of the front contact face 10a of said coupling frame, said locking arm pivoting on a transverse shaft 24 housed in a clevis 25 extending along the underside of the top rail 13 of the portal frame 12.

The forward end of this locking arm 22, opposite to the locking hook 23, is in addition coupled to the rod of an actuating cylinder 35 whose barrel is hinged in the portal frame 17, said cylinder being adapted to rotate said arm between a locking position and an unlocking position.

This coupling frame 10 also comprises two additional centering pins 26, 27 projecting from the rear face 13b of the top rail 13 of the portal frame 12, each of said centering pins having a cylindrical base 28 extended by a section 29 of conical shape.

In addition, each of these centering pins 26, 27 has two flat portions such as 30 formed in planes parallel to the upper face 11a of the cross-piece 11.

The coupling frame 10 lastly comprises a drive element 31 adapted to be coupled to the universal drive shaft 32 equipping the agricultural tractor 1.

This drive element 31, described in detail below, in addition is housed in a track 33 having its guide axis parallel to the longitudinal axis (x), secured to the central portion 11c of the upper face 11a of the cross-piece 11.

Finally, this drive element 31 is coupled to the rod of an actuating cylinder 34 whose barrel is hinged on the track 33, said cylinder being adapted to cause translational movement of said drive element between a disengaged position and an engaged position.

As for the coupled frame 40 of this first embodiment of the coupling device, it firstly comprises a welded structure 41 forming a framework consisting of a top rail 42, a bottom rail 43, and two uprights such as 44, constituted of tubes having rectangular cross-sections.

This coupled frame 40 further comprises two devises such as 45, each extending over the rear face 44a of an upright, at the foot of the upright, each of said devises housing a transverse shaft 46 constituting the catch member of a locking member (not shown) of the agricultural implement 3.

This coupled frame 40 comprises a third clevis 47 also housing a transverse shaft 48 constituting the catch member of a third locking member (not shown) of the agricultural implement 3.

This clevis 47 is secured to the outer face 50a of the web 50 of a generally U-shaped beam structure 49, secured midway along the top rail 42 so that it extends perpendicular to and to either side of said top rail.

This web 50 is further pierced with a plurality of holes 51 distributed along a vertical axis (z), suitable for adjusting the vertical position of the transverse shaft 48 according to the positioning of the locking member of the agricultural implement 3.

The U-beam structure 49 houses, in its lower portion extending below the top rail 42 of the framework 40, a transverse shaft 52 adapted to form the catch member for the hook 23 of the locking arm 22 of the coupling frame 10.

Note also that the U-beam structure 49 is adapted to comprise a forward front face 49a defining a flat front face for contact with the front contact face 10a of the coupling frame 10.

The coupled frame 40 also comprises two plates 53, 54 extending in a plane (x, y) and each integral to the front face 44b of an upright 44 of the framework 41, substantially at the junction of the latter with the bottom rail 43 of the framework 41.

Each of these plates 53, 54 forms a base plate:
- equipped with a lower contact face, such as 53a, adapted to rest against the upper face 11a of the cross-piece 11 of the coupling frame 10, in the assembled position of the two frames 10, 40,
- pierced with a circular opening 55 of a diameter fitting with the diameter of the base 20 of the centering pins 18, 19, and having a countersink 56 where it joins the contact face 53a.

The coupled frame 40 comprises two circular openings 57, 58 made in the top rail 42 of the framework 41, each intended to house a centering pin 26, 27 and therefore having a diameter fitting with the diameter of the base 28 of these centering pins 26, 27, and comprising flat bearing surfaces for supporting each of the flat surfaces 30 of said centering pins.

The coupled frame 40 also comprises a drive element 59 adapted to be coupled to the universal drive shaft 60 equipping the agricultural implement 3.

This drive element 59 is secured to the upper face 43a of the bottom rail 43 of the framework 41, substantially midway along the length thereof, and comprises a rotating shaft 61 fixed in translation, equipped with a splined rear coupling section 62 for coupling with the universal drive shaft 60, and a front coupled section 63 for coupling with the drive element 31 of the coupling frame 10 and comprising a longitudinal bore provided with splines.

As mentioned above, this drive element 59 is adapted to mate with the drive element 31 of the coupling frame 10, and the latter comprises a rotating shaft 36 movable in translation, equipped with a splined front coupling section 37 for coupling with the universal drive shaft 32 of the coupling frame 10, and a splined rear coupling section 38 for coupling with the coupled section 63 of rotating shaft 61.

In addition, the spline teeth of the front coupled section 63 of rotating shaft 61 and of the splined rear coupling section 38 of rotating shaft 36 advantageously consist of mutually engaging teeth facilitating the coupling obtained by translation of rotating shaft 36.

The coupled frame 40 may further be provided with telescoping legs (not shown), consisting for example of hydraulic cylinders, adapted to be deployed under the framework 41 of said coupled frame so as to support the latter after unhitching the agricultural implement 3.

Finally, the two frames, coupling 10 and coupled 40, are equipped with complementary hydraulic connection devices of any known type (not shown), comprising a plurality of mutually facing connectors that connect automatically when said hydraulic connection devices are coupled.

Figures 1, 2:
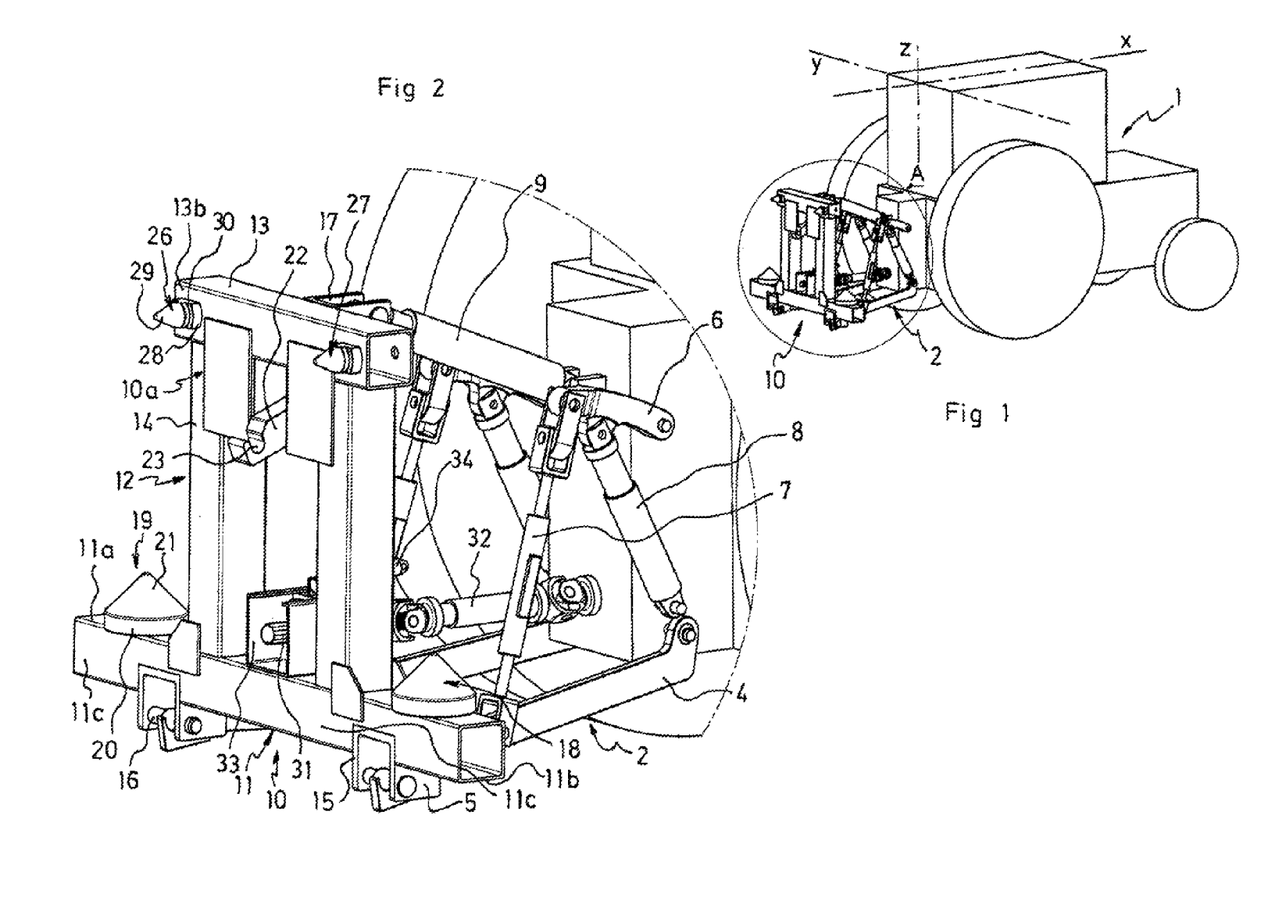
FIG. 1 is a schematic perspective view of an agricultural tractor equipped with a coupling frame according to a first embodiment of a coupling device of the invention.
FIG. 2 is an enlarged view of the linkage system of the agricultural tractor represented in FIG. 1, equipped with the coupling frame according to the first embodiment of the coupling device of the invention.
Figure 3:
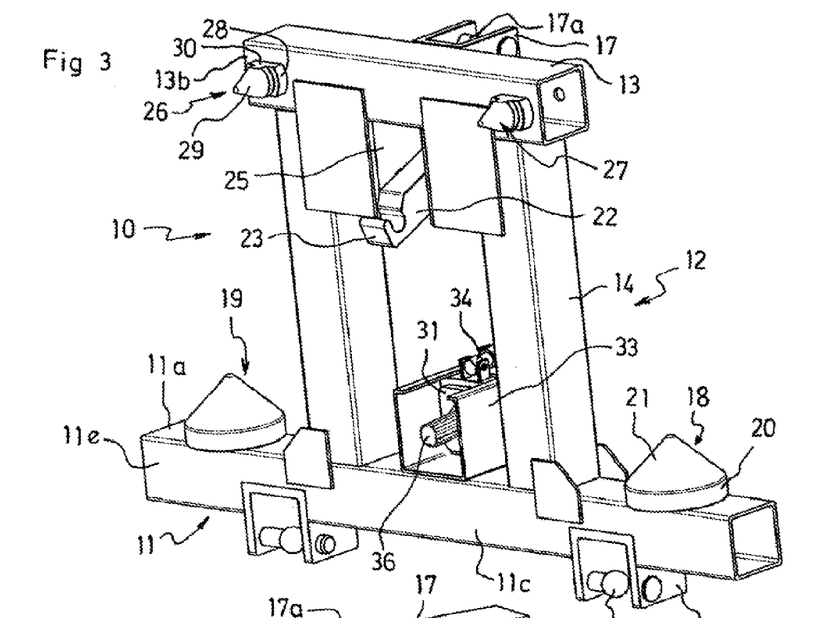
FIG. 3 is a front perspective view of this coupling frame.
Figure 4:
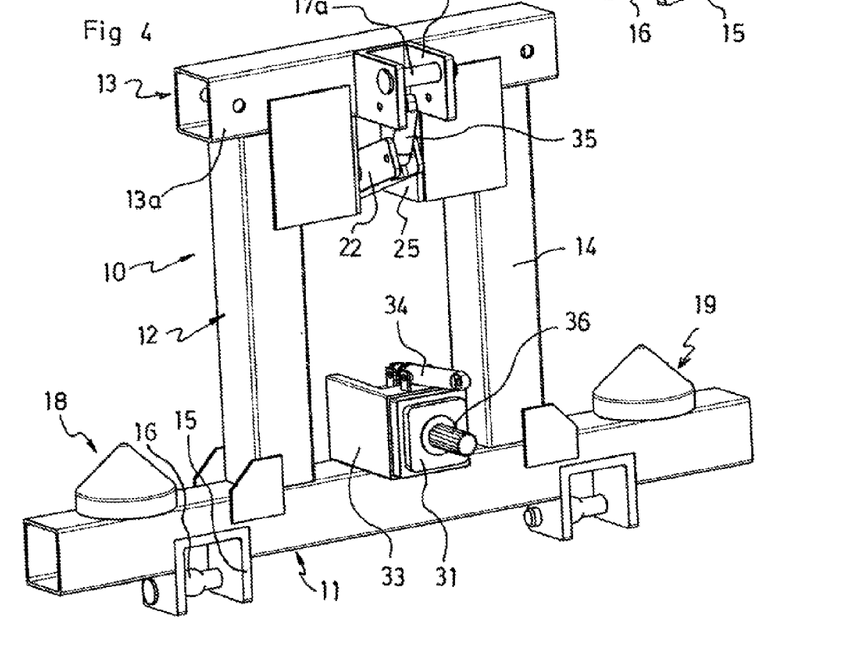
FIG. 4 is a rear perspective view of this coupling frame.
Figure 5:
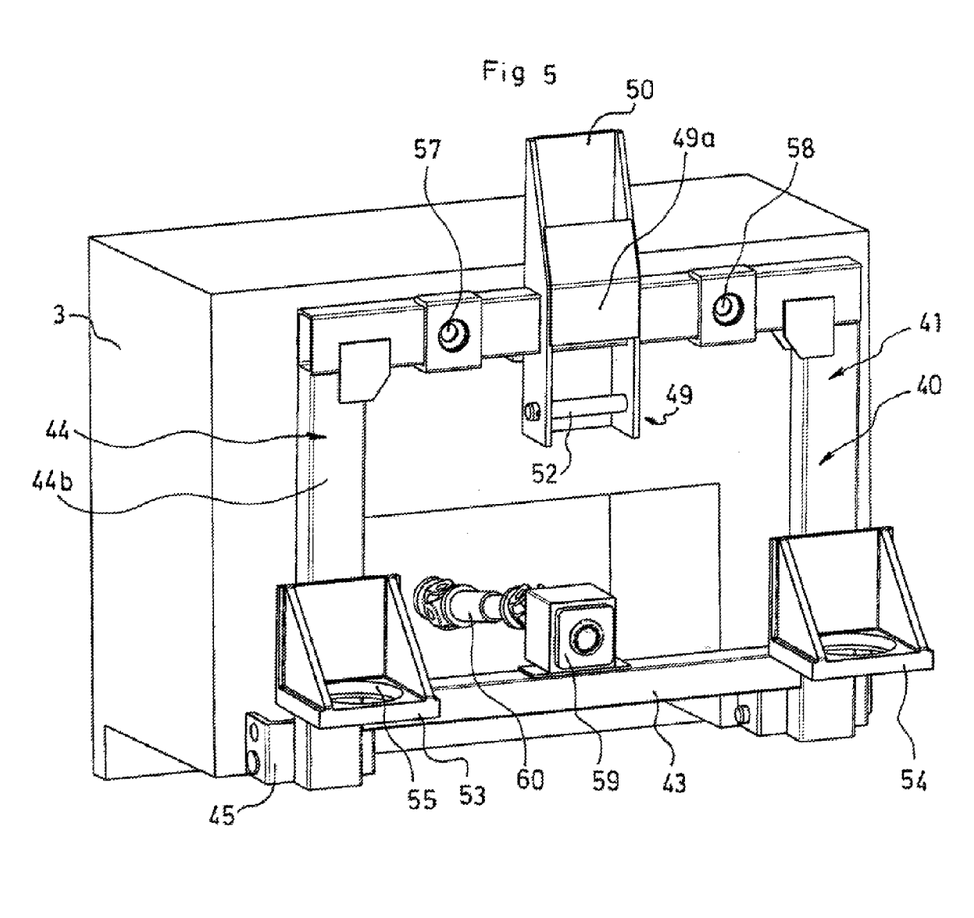
FIG. 5 is a highly schematic perspective view of an agricultural implement equipped with the coupled frame according to the first embodiment of the coupling device of the invention.
Figures 6, 7, 7A:
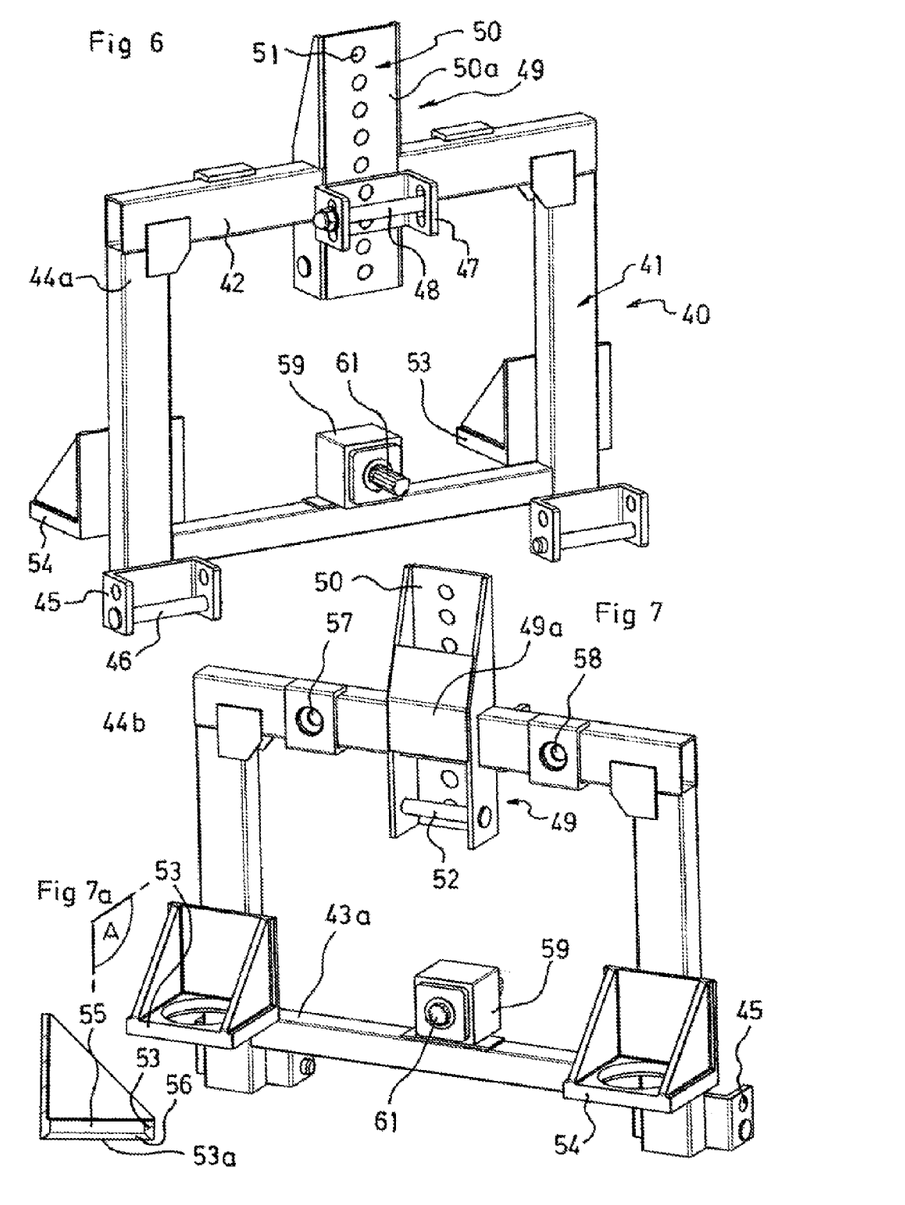
FIG. 6 is a rear perspective view of this first embodiment of the coupled frame.
FIG. 7 is a front perspective view of this coupled frame.
FIG. 7a is a partial section view, through a vertical plane, of a base plate of the coupled frame.
Figure 8:
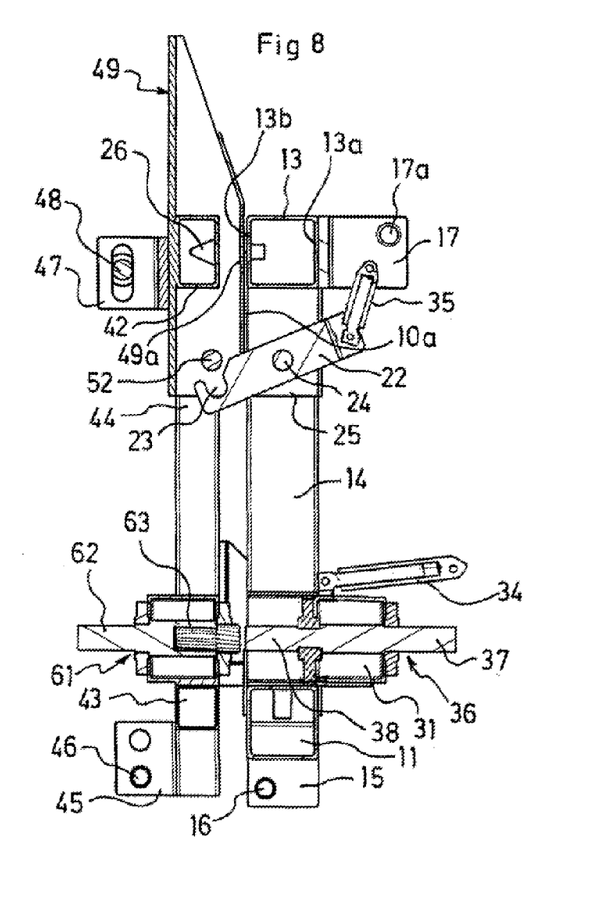
FIGS. 8 and 9 are longitudinal section views representing the first embodiments of the coupling and coupled frames in their abutting position, respectively before locking (FIG. 8) and after locking (FIG. 9)
Figure 9:
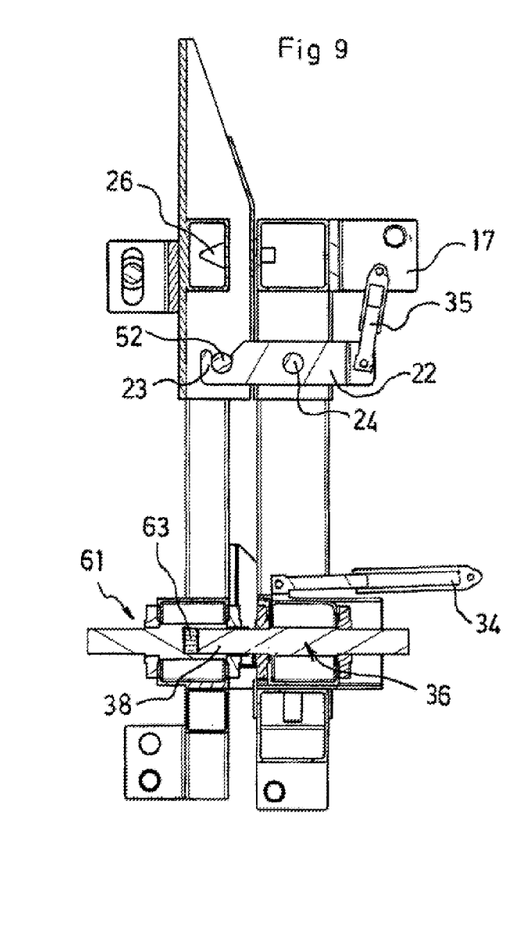
Figure 10A:
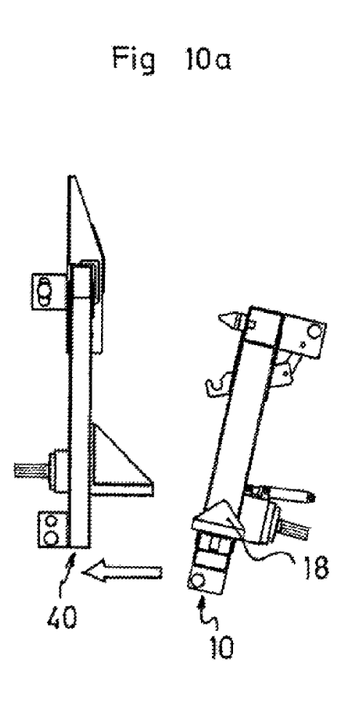
FIGS. 10a to 10e are schematic longitudinal views showing the successive steps of coupling an agricultural implement to an agricultural tractor, by means of the first embodiment of the coupling device of the invention.
Figure 10B:
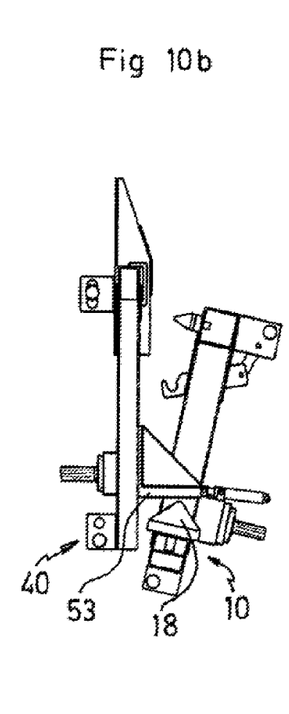

As is represented in FIGS. 10a to 10e, to prepare for coupling, the agricultural tractor is moved in reverse (FIG. 10a) to preposition the centering pins 18, 19 of the coupling frame 10 directly above the holes 55 of the base plates 53 of the coupled frame 40 (FIG. 10b).

It should be noted that during this maneuver, a coupling device where the centering pins have a base 20 with a diameter of 10 cm provides a comfortable positioning margin of about 15 cm along both the longitudinal axis (x) and the transverse axis (y).

Figure 10C:
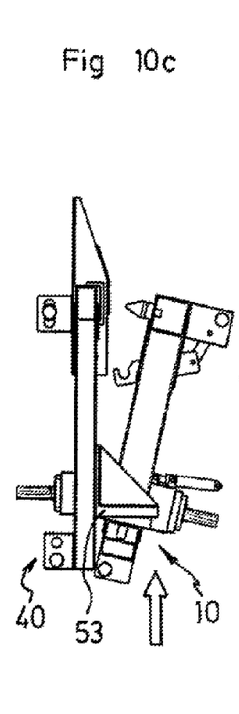

Once this prepositioning is obtained, the actuating cylinders 8 of the linkage system 2 are deployed so as to raise the coupling frame 10 until partial contact of the respective contact faces 11a, 53a of the base plates 11, 53, 54, is obtained, a position where the centering pins 18, 19 are partially engaged with the facing holes 55 (FIG. 10c).

Figure 10D:
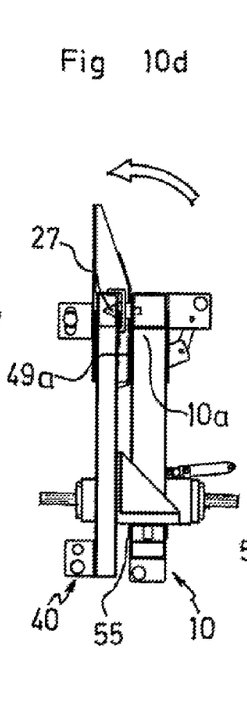
Figure 10E:
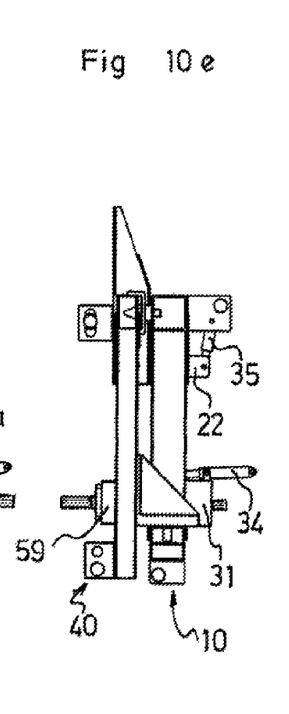
Figure 11:
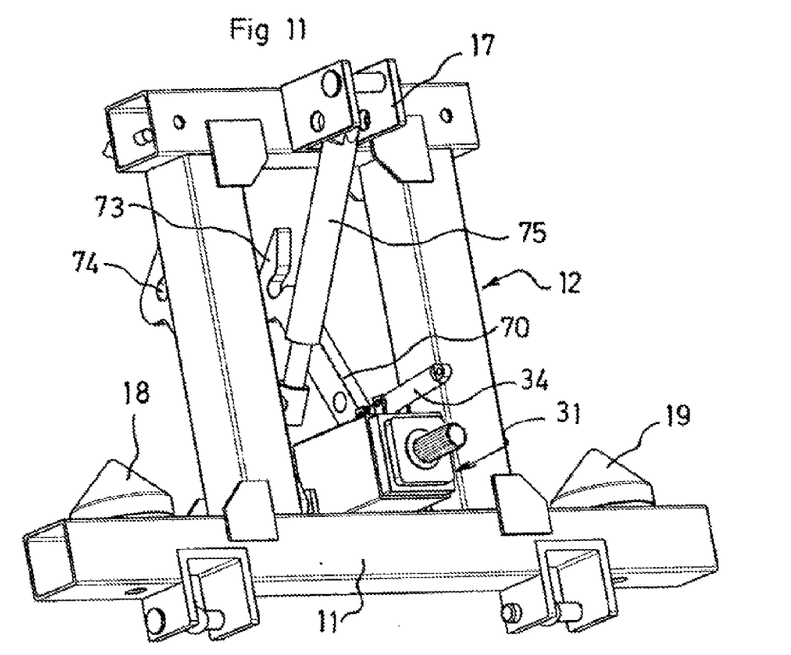
FIG. 11 is a rear perspective view of a coupling frame according to a second embodiment of the coupling device of the invention.
Figure 12:
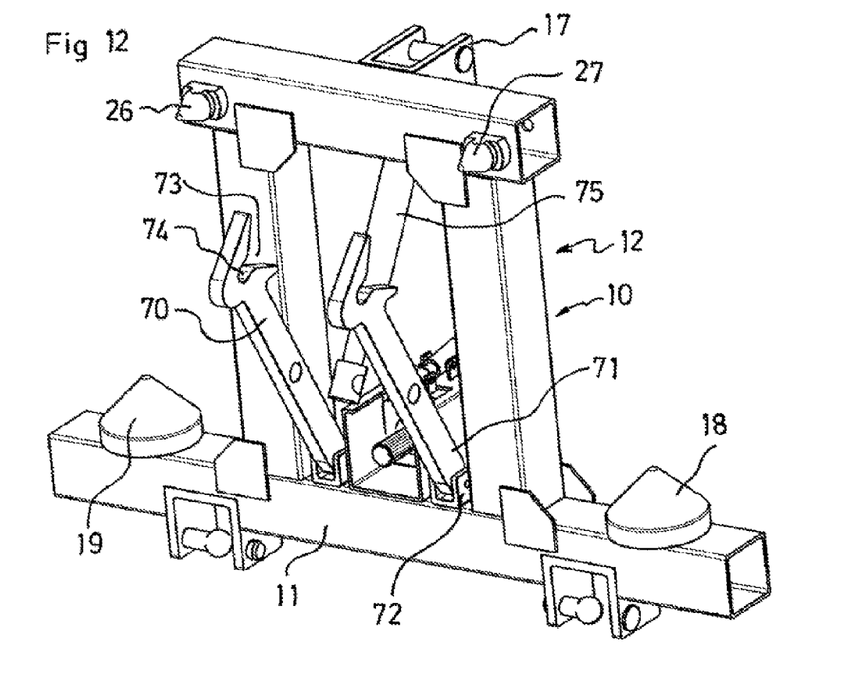
FIG. 12 is a front perspective view of this coupling frame.
Figure 13:
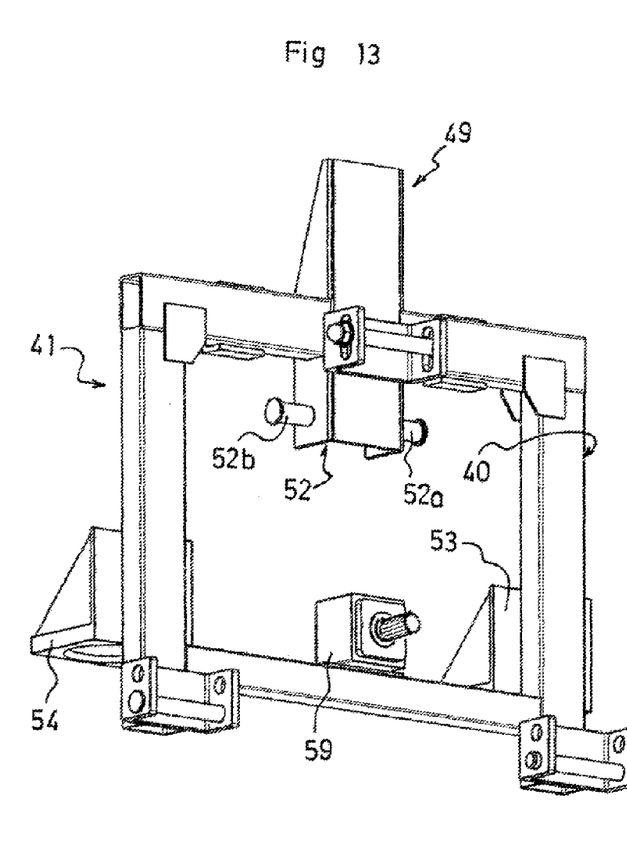
FIG. 13 is a rear perspective view of a coupled frame according to the second embodiment of the coupling device of the invention.
Figure 14:
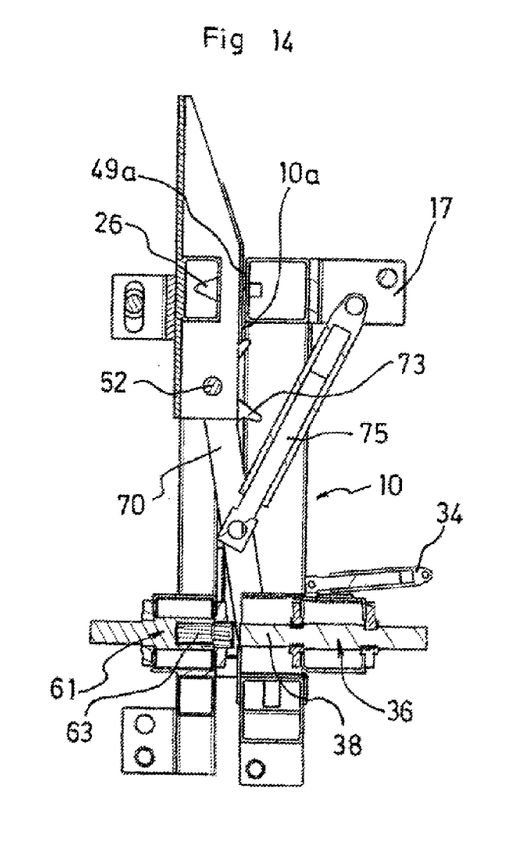
FIG. 14 is a longitudinal section view showing the coupling and coupled frames of this second embodiment of the coupling device, in their abutting and locked position.

The next step is to deploy the central actuating cylinder 9 to cause a tilting of the coupling frame 10, during which the centering pins 18, 19 serve as the pivots of said tilting, bringing the front faces 10a, 49a of the two frames 10, 40 into contact with each other, a position where the opposing faces 11a, 53a of the base plates 11, 53, 54 are also in contact with one another (FIG. 10d).

In addition, when finished tilting, the supplemental centering pins 26, 27 lodge in their facing holes 57, 58 and ensure perfect relative immobilization of the two frames along axis (z), this immobilization being further improved by the presence of the flat portions 30.

The last operations consist of locking the two frames 10, 40 by actuation of actuating cylinder 35, an operation during which the cylinder is positioned in a neutral mode (or "floating" mode), and coupling the drive elements 31, 59 and therefore the universal drive shafts 32, 60 by actuation of actuating cylinder 34.

Such a coupling device therefore makes it possible to perform all coupling and uncoupling operations for agricultural implements 3 directly, from the tractor cab or seat, by means of adding at said cab or seat:
- means for supplying power or fluids (hoses, distributors, etc.) to the various hydraulic components (cylinders, connectors, etc.),
- control elements placed in or by the cab or seat, for controlling the various hydraulic components.

The difference between the coupling device represented in FIGS. 11-20 and the one described above lies in the design of the means for the relative tilting of the two frames, adapted in this second embodiment to fulfill two functions: cause the tilting of the coupling frame 40 and ensure the locking of the two frames at the end of the tilting.

Therefore, only the tilting means of this second embodiment are described in detail below. For the other identical elements of the two embodiments, these are referred to below by the same numeric references as were used for the first embodiment.

According to this embodiment, the locking arm 22 of the first embodiment is eliminated, and the coupling device comprises tilting means comprising two locking arms 70, 71 whose lower end is mounted to pivot about a transverse shaft housed in a clevis 72 secured to the upper face 11a of the cross-piece 11. The upper end of each arm forms a generally V-shaped groove 73 having a groove bottom 74 of a slightly retentive shape.

These two arms 70, 71 are positioned symmetrically on either side of the drive element 31, on the central section 11c of the cross-piece 11. They are actuated simultaneously by a single actuating cylinder 75 positioned between said arms, whose rod is coupled substantially at mid-length of said arms, and whose barrel is hinged in the clevis 17.

For the coupled frame 40, the only change relative to the first coupling device lies in the modification of the transverse shaft 52 whose length is increased so that it has, on either side of the U-beam structure 49, a section 52a, 52b for catching a locking arm 70, 71.

In this solution, the tilting is initiated after actuation of the linkage system, and is obtained by activating the retraction of the cylinder 75 which pivots the two arms 70, 71 so that their upper end travels a path where it engages with the catch member 52 and then causes the coupling frame 10 to tilt until the adjoining position of the two frames 10, 40 is obtained, a position where said arms further ensure the locking of said frames.

It should be noted that, as shown in the figures, the central arm 9 (or upper arm) of the linkage system 2 also consists, in this second embodiment, of a hydraulic cylinder 9. In fact, this central cylinder 9 allows, according to this embodiment, easily adapting the tilt angle of the coupling frame to the various tilt angles of agricultural implements 3.

As with the first embodiment represented in FIGS. 1 to 10, the third embodiment relates to a coupling device in which the relative tilting of the two frames is ensured by means of the cylinder 9 forming the central arm of the three-point linkage system.

Figure 15:
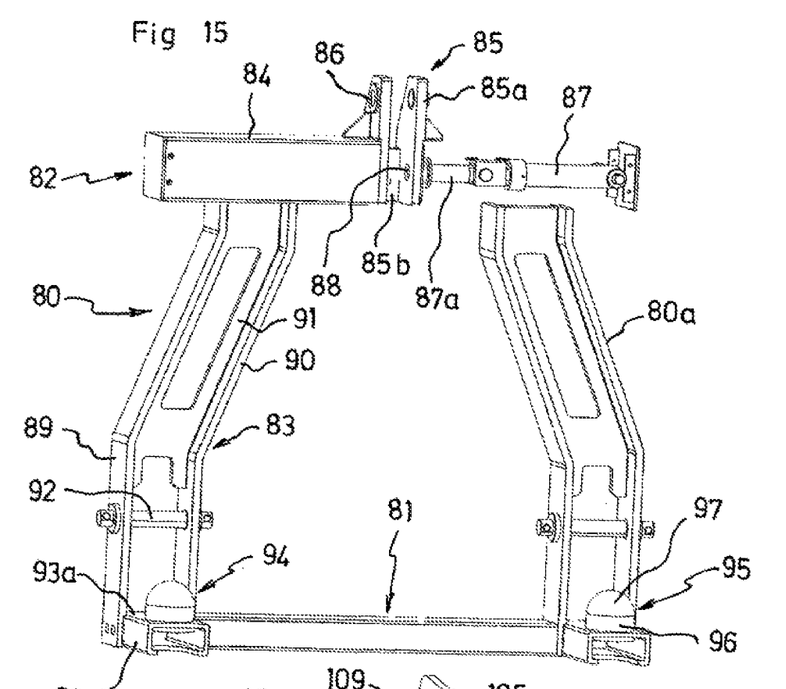
FIG. 15 is a front perspective view of a coupling frame according to a third embodiment of the coupling device of the invention.

Firstly, the coupling frame 80 of this coupling device has a generally trapezoidal shape provided with a flat front face 80*a* for contact with the coupled frame of said coupling device. This coupling frame 80 consists of a welded structure composed of a bottom rail 81 extending between the lower ends of two uprights such as 83 having upper ends from which a top rail 82 extends.

The bottom rail 81 consists of a tube of rectangular cross-section.

The top rail 82 is divided into three sections consisting of a central clevis 85 formed of two flanges 85*a* connected by a web 85*b*, with an end section 84 formed of a tube of square cross-section extending from each flange.

In addition, the two flanges 85*a* have a height greater than the height of the tubes 84, and therefore have surface portions extending beyond the upper face of said tubes, each such portion being drilled with opposing holes 86 for accommodating a transverse shaft constituting the catch member for the central arm 9 of the linkage system 2.

In addition, one of the tubular end portions 84 of this top rail 84 houses a hydraulic cylinder 87 arranged so that its rod 87*a* can be deployed into the clevis 85 through a hole 88 in the flange 85*a*, thus plugging the central end face of said end section.

The two uprights 83 are each composed of two parallel flat bars 89, 90 bent to present an angled longitudinal profile giving the coupling frame 80 its trapezoidal shape, said flat bars being connected by a brace 91 along substantially two-thirds of their upper portion, giving them an H-shaped cross-section.

In addition, each of these uprights 83 houses, in its lower portion where there is no brace 91, a shaft 92 extending between the two flat bars 89, 90 and forming the catch member for the locking hook 5 of one of the lower arms 4 of the linkage system 2.

This coupling frame 80 further comprises two base plates such as 93 provided with flat upper contact faces 93*a*, each housed and fixed between the lower ends of the flat bars 89, 90 of an upright 83, so as to extend the lower rail 81.

Lastly, the coupling frame 80 comprises two centering pins 94, 95 each protruding from the flat contact face 93*a* of a base plate 93, and each comprising a cylindrical base 96 extending in a hemispherical section 97.

Figure 16:
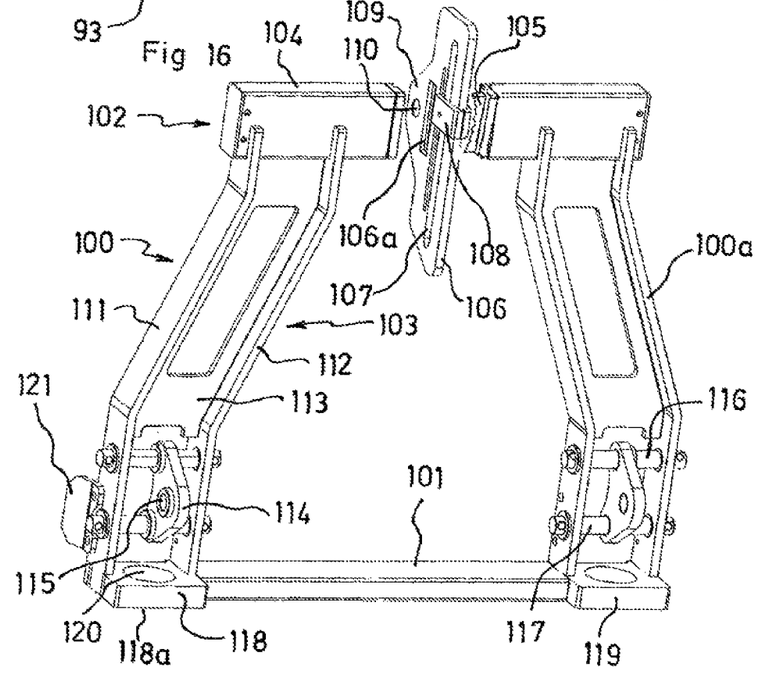
FIG. 16 is a front perspective view of a coupled frame according to the third embodiment of the coupling device of the invention.

The coupled frame 100 of this linkage device also has a generally trapezoidal shape provided with a flat front face 100*a* for contact with the coupling frame 80 of said coupling device. This coupled frame 100 consists of a welded structure composed of a bottom rail 101 extending between the lower ends of two uprights such as 103 having upper ends from which a top rail 102 extends.

The bottom rail 101 consists of a tube of rectangular cross-section.

The top rail 102 is divided into three sections consisting of a central vertical plate 105 (of which only a portion is shown) from which an end section 104 formed of a tube of square cross-section extends on each side.

The central plate 105 further serves as an attachment support for a plate 106 for connecting the coupled frame 100 to the agricultural implement 3, and for locking, comprising for the purposes of this attachment a vertical slot 106*a* through which said central plate extends.

For the purposes of connection to the agricultural implement 3, plate 106 comprises a rear portion having a vertical slot 107 for receiving an attachment bolt supported by the agricultural implement 3.

Such a slot 107 allows the coupled frame 100 to adapt to a wide range of heights of the upper attachment element of agricultural implements.

Given this length of the slot 107, plate 106 is further provided with two reinforcing flats such as 108 adapted for clamping said plate 106 at said slot.

Plate 106 also comprises a forward portion 109 adapted to fit into the clevis 85 of the coupling frame 80, pierced by a hole 110 formed so as to coincide with hole 88 when the two frames 80, 100 are in the paired position, such that the relative locking of said frames is achieved by deployment of the rod 87*a* of the actuating cylinder 87.

The two uprights 103 of the coupled frame 100 are similar to those of the coupling frame 80 and are composed of two parallel flat bars 111, 112 bent to present an angled longitudinal profile giving the coupled frame 100 its trapezoidal shape, said flat bars being connected by a brace 113 along substantially two-thirds of their upper portion, giving them an H-shaped cross-section.

In addition, each of these uprights 103 houses, in its lower portion where there is no brace 113, two superimposed shafts 116, 117 extending between the two flat bars 111, 112, forming the guiding rods for a slider 114 arranged to move along said shafts in a path corresponding to the distance separating the two flat bars 111, 112.

Each slider 114 constitutes a part for connecting the coupled frame 100 with the agricultural implement 3, and for the purposes of such connection the slider 114 is pierced with a hole 115 for receiving an attachment bolt carried by said agricultural implement.

In addition, due to the ability to move each slider 114 along a predetermined path, the coupled frame 100 can accommodate agricultural implements 3 of various widths with no need for adaptation.

The coupled frame 100 also comprises two base plates 118, 119 provided with flat lower contact faces 118*a*, each housed and fixed between the lower ends of the flat bars 111, 112 of an upright 103, so as to extend the lower rail 101.

Each of these base plates 118, 119 is pierced by a circular hole 120 having a diameter fitting with the diameter of the base 96 of the centering pins 94, 95, and having a countersink (not shown) where it joins the contact face 118*a*.

Lastly, the coupled frame comprises, arranged on the inner face of each upright 103, a guide plate 121 placed at the lower portion of said upright.

Each of these guide plates 121 is angled so as to diverge from a longitudinal vertical plane (plane containing axis (x)), and thus forms a ramp to guide the coupling frame 80 as it is tilted, to correct for a possible deviation in the relative positioning of this coupling frame 80.

The coupling procedure using this third embodiment of the coupling device is similar to that of the first embodiment.

Once the agricultural tractor 1 is prepositioned, the actuating cylinders 8 of the linkage system 2 are deployed so as to raise the coupling frame 80 until partial contact of the respective contact faces 93*a*, 118*a* of the base plates 93, 118, 119 is obtained, a position where the centering pins 94, 95 are partially engaged with the facing holes 120.

The next step is to deploy the central actuating cylinder 9 to cause a tilting of the coupling frame 80, during which the centering pins 94, 95 serve as the pivots of said tilting, bringing the front faces 80a, 100a of the two frames 80, 100 into contact with each other, a position where the opposing faces 93a, 118a of the base plates 93, 118, 119 are also in contact with one another.

Furthermore, in this final paired position of the two frames 80, 100, the front portion 109 of plate 106, forming a catch, is inserted into the clevis, and the actuating cylinder 87 can be activated to ensure the relative locking of said frames.

In addition, it should be noted that correct positioning of the catch 109 may be confirmed before actuation of the cylinder 87, by equipping the coupling frame 80 with a sensor to detect the presence of said catch.

The coupling devices of the invention described above are therefore adapted to allow an operator of average skill to perform all the operations of coupling an agricultural implement to the linkage system of an agricultural tractor: the actual hitching of the agricultural implement and the coupling of the universal drive shafts.

The invention claimed is:

1. A method for coupling an agricultural implement (3) to a three-point linkage system (2) of an agricultural tractor (1) of longitudinal axis (x), wherein:
    a coupling device is used comprising two frames (10, 40; 80, 100) consisting of a coupling frame (10; 80), provided with fastening members (16, 17a; 92) for attaching to the three-point linkage system (2) of the agricultural tractor (1), and a coupled frame (40; 100), provided with fastening members (46, 48; 106, 107, 114) for attaching to the agricultural implement (3), both adapted to extend, respectively, transversely to the agricultural tractor (1) and to the agricultural implement,
    the coupling is performed, in an initial prepositioning position of the agricultural tractor (1) relative to the agricultural implement (3), by maneuvers to pair the two frames (10, 40, 80, 100), then by a relative locking of said frames,
    said coupling method being characterized in that:
    a coupling device is created:
        in which the coupling frame (10; 80) and the coupled frame (40; 100) each comprise two base plates,(11, 53, 54; 93, 118, 119), arranged at the base of said frames so that the base plates (11, 53, 54; 93, 118, 119) of each frame (10, 40; 80, 100) are spaced apart from each other and aligned along a transverse axis (y), and so that each base plate (11; 93) of the coupling frame (10; 80) forms, with one of the base plates (53, 54; 118, 119) of the coupled frame (40; 100), a pair of base plates (11/53, 11/54; 93/118, 93/119) provided with flat contact faces (11a, 53a; 93a, 118a) arranged such that the contact face (53a; 118a) of the base plate (53, 54; 118, 119) of the coupled frame (40; 100) rests on the contact face (11a; 93a) of the base plate (11; 93) of the coupling frame (10; 80) when said frames are in the paired position,
        one of the base plates (53, 54; 118, 119) of each pair of base plates ((11/53, 11/54; 93/118, 93/119) being pierced by a facing hole (55; 120) of predetermined cross-section and dimensions,
        and the other base plate (11; 93) of each pair of base plates (11/53, 11/54; 93/118, 93/119) comprising, projecting from a contact face (11a; 93a), a centering member (18, 19; 94, 95) of decreasing cross-section in at least two planes perpendicular to said contact face and respectively parallel to axes (x) and (y), starting from a base section of dimensions fitting with those of the facing hole (55; 120) of the other base plate (53,54; 118, 119), comprising means (9; 70, 71, 75) for relative tilting of the two frames (10, 40; 80, 100),
    and the coupling is carried out in the initial prepositioning position of the agricultural tractor (1) relative to the agricultural implement (3), by
        (a) actuating the linkage system (2) so as to cause each centering member (18, 19) to partially engage with the facing hole (55, 120), by the raising of the coupling frame,
        then (b) generating the relative tilting of the two frames (10, 40) so as to cause, in the position where the centering members (18, 19; 94, 95) are partially engaged with the facing holes (55; 120), a tilting during which said centering members serve as a pivot for said tilting, until a final paired position is obtained where the contact faces (11a, 53a; 93a, 118a) of the base plates (11, 53, 54; 93, 118, 119) of each of the two pairs of base plates (11/53, 11/54; 93/118, 93/119) are superimposed and in contact with one another, and the centering members (18, 19; 94, 95) are fully engaged with the facing holes (55; 120).

2. The coupling method according to claim 1, wherein the linkage system (2) is equipped with a central arm (9) consisting of an actuating cylinder, and (b) wherein the relative tilting of the two frames (10, 40; 80, 100) is generated by activating deployment of said cylinder.

3. The coupling method according to claim 1, wherein:
    the coupling frame (10) is equipped with at least one pivot arm (70, 71) pivoting on said coupling frame (10) about a pivot axis at least substantially parallel to axis (y), positioned at a base of said coupling frame, each of said pivot arms having a hook-shaped end (73, 74) that engages, in the position where the centering members (18, 19) are partially engaged with the facing holes (55), with a facing catch member (52) integral with the coupled frame (40),
    (b) the relative tilting of the two frames is generated by pivoting each pivot arm (70, 71) so that the respective hook-shaped end (73, 74) travels a path in which the respective hook-shaped end engages the facing catch member (52), causing the coupling frame (10) to tilt.

4. A device for coupling an agricultural implement (3) to a three-point linkage system (2) of an agricultural tractor (1) of longitudinal axis (x), comprising a coupling device comprising two frames (10, 40; 80, 100) consisting of a coupling frame (10; 80), provided with fastening members (16, 17a; 92) for attaching to the three-point linkage system (2) of the agricultural tractor (1), and a coupled frame (40; 100), provided with attachment members (46, 48; 106, 107, 114) for attaching to the agricultural implement (3), both adapted to extend, respectively, transversely to the agricultural tractor (1) and to the agricultural implement (3), said coupling frame and coupled frame being adapted to be paired and comprising relative lock (22, 23, 52; 70, 71, 52; 87, 109, 110), said coupling device being characterized in that:
    the coupling frame (10; 80) and the coupled frame (40; 100) each comprise two base plates (11, 53, 54; 93, 118, 119), arranged at the base of said frames, so that the base plates (11, 53, 54; 93, 118, 119) of each frame (10, 40; 80, 100) are spaced apart from each other and aligned along a transverse axis (y), and so that each base plate (11; 93) of the coupling frame (10; 80) forms, with one of the base plates (53, 54; 118, 119) of the coupled frame (40; 100), a pair of base plates (11/53, 11/54; 93/118, 93/119) provided with flat contact faces (11a, 53a; 93a, 118a) arranged such that the contact face (53a; 118a) of the base plate (53, 54; 118, 119) of the coupled frame (40; 100) rests on the contact face (11a; 93a) of the base plate (11; 93) of the coupling frame (10; 80) when said frames are in the paired position, one of the base plates (53, 54; 118, 119) of each pair of base plates ((11/53, 11/54; 93/118, 93/119) being pierced by a facing hole (55; 120) of predetermined cross-section and dimensions, and the other base plate (11; 93) of each pair of base plates (11/53, 11/54; 93/118, 93/119) comprising, projecting from its contact face (11a; 93a), a centering member (18, 19; 94, 95) of decreasing section in at least two planes perpendicular to said contact face and respectively parallel to axes (x) and (y), starting from a base section of dimensions fitting with those of the facing hole (55; 120) of the other base plate (53, 54; 118, 119), and said base plates being arranged to be brought to face each other so that each centering member (18, 19; 94, 95) partially engages with the facing hole (55; 120), during the raising of the coupling frame (10; 80) generated by actuation of the three-point linkage system (2), means (9; 70, 71, 75) for relative tilting of the two frames (10, 40; 80, 100) are adapted to cause, in the position where the centering members (18, 19; 94, 95) are partially engaged with the facing holes (55; 120), a tilting during which said centering members serve as a pivot for said tilting.

5. The coupling device according to claim 4, wherein the means for relative tilting consists of an actuating cylinder (9) arranged to constitute the central arm of the linkage system (2).

6. The coupling device according to claim 5, wherein the relative lock comprises:

at least one locking arm (22) pivoting on the coupling frame (10), provided with a hook-shaped end (23) that engages, in the paired position of the two frames (10, 40), with a facing catch member (52) integral with the coupled frame (40), means (35) for actuating each locking arm (22), able to pivot it between an unlocked position and a locked position where the facing catch member (52) is locked in place.

7. The coupling device according to claim 5, wherein the relative lock comprises an actuating cylinder (87) carried by the coupling frame (80) so that it extends along a transverse axis orthogonal to axis (x), provided with a rod (87a) forming a bolt adapted to cooperate with a catch (109, 110) mounted on the coupled frame (100), when the two frames (80, 100) are in the paired position.

8. The coupling device according to claim 4, wherein the means for relative tilting comprise:

at least one pivot arm (70, 71) pivoting on the coupling frame (10) about a pivot axis at least substantially parallel to axis (y), positioned at a base of said coupling frame, each of said pivot arms having a hook-shaped end (73, 74) that engages, in the position where the centering members (18, 19) are partially engaged with the facing holes (55), with a facing catch member (52) integral with the coupled frame (40), means (75) for actuating each pivot arm (70, 71), adapted to pivot the pivot arm so that the respective hook-shaped end (73, 74) travels a path in which the respective hook-shaped end engages the facing catch member (52), causing the coupling frame (10) to tilt until the adjoining position of the two frames (10, 40) is obtained.

9. The coupling device according to claim 8, wherein the hook-shaped end (73, 74) of each pivot arm (70, 71) and each associated catch member (52) have complementary shapes adapted to lock the two frames (10, 40) in position.

10. The coupling device according to one of claim 8 or 9, comprising an actuating cylinder (9) arranged to constitute the central arm of the linkage system (2).

11. The coupling device according to one of claims 4 to 9, wherein each hole (55; 120) made in a base plate (53, 54; 118, 119) has a countersink (56) where it joins the contact face (53a; 118a) of said base plate.

12. The coupling device according to claim 11, wherein:

each hole (55; 120) made in a base plate (53, 54; 118, 119) consists, in the extension of the countersink (56), of a hole of constant transverse cross-section, each centering member (18,19; 94, 95) comprises, starting from the contact face (11a; 93a) of the base plate (11; 93), a base (20; 96) of constant transverse cross-section fitting with that of the facing hole (55; 120).

13. The coupling device according to claim 12, wherein each centering member (18, 19; 94, 95) comprises a cylindrical base (20; 96) extending in a section (21; 97) of conical or hemispherical shape, each hole (55; 120) made in a base plate (53, 54; 118, 119) having a circular cross-section of a diameter fitting with that of the base (20; 96) of the centering members (18, 19; 94, 95).

14. The coupling device according to one of claims 4 to 9, wherein the coupling frame (10; 80) and the coupled frame (40; 100) comprise front faces (10a, 49a; 80a, 100a) for the contact of said frames in a final adjoining position.

15. The coupling device according to claim 14, wherein:

one of the frames (10) comprises, projecting from a front contact face (10a), at least one centering pin (26, 27) of decreasing cross-section along at least one plane perpendicular to said front contact face and parallel to the longitudinal axis (x), the other frame (40) comprises, for each centering pin (26, 27), a hole (57, 58) opening onto a front face (49a), having a cross-section suitable for receiving said centering pin.

16. The coupling device according to claim 15, wherein each centering pin (26, 27) comprises two flat portions (30) in planes parallel to plane (x, y), each associated hole (57, 58) having flat bearing surfaces for each of said flat portions.

17. The coupling device according to claim 15, wherein each centering pin (26, 27) is arranged on an upper portion of the coupling frame (10).

18. The coupling device according to one of claims 4 to 9, comprising:

complementary drive elements (36, 61) respectively positioned on the coupling frame (10) and coupled frame (40) and both adapted to be coupled to universal drive shafts (32, 60) equipping the agricultural tractor (1) and the agricultural implement (3), means (34) for the relative displacement of the complementary drive elements (36, 61), which are able, in the paired position of the two frames (10, 40), to move them between an engaged position where two universal drive shafts (32, 60) are coupled, and a disengaged position.

19. The coupling device according to claim 18, wherein:
the drive element (61) of the coupled frame (40) is translationally fixed on said coupled frame,
the drive element (36) of the coupling frame (10) is arranged within a track (33) having a guide axis parallel to the longitudinal axis (x), attached to said coupling frame, said drive element being associated with means for translational movement (34) able to move said drive element within the track (33).

20. The coupling device according to claim 18, wherein the drive elements respectively comprise a shaft (38) provided with splines and a shaft (63) pierced with a longitudinal bore provided with splines, said splines forming complementary engaging teeth.

* * * * *